United States Patent
Alijan et al.

(10) Patent No.: US 11,637,609 B2
(45) Date of Patent: Apr. 25, 2023

(54) ARRAY ANTENNA ADAPTIVE DIGITAL PRE-DISTORTION WITH BAYESIAN OBSERVATION ANALYSIS

(71) Applicant: NOKIA SOLUTIONS AND NETWORKS OY, Espoo (FI)

(72) Inventors: Mehdi Alijan, Irving, TX (US); Darrell Barabash, Grapevine, TX (US)

(73) Assignee: NOKIA SOLUTIONS AND NETWORKS OY, Espoo (FI)

(*) Notice: Subject to any disclaimer, the term of this patent is extended or adjusted under 35 U.S.C. 154(b) by 199 days.

(21) Appl. No.: 17/274,337

(22) PCT Filed: Sep. 10, 2018

(86) PCT No.: PCT/US2018/050165
§ 371 (c)(1),
(2) Date: Mar. 8, 2021

(87) PCT Pub. No.: WO2020/055378
PCT Pub. Date: Mar. 19, 2020

(65) Prior Publication Data
US 2022/0271816 A1    Aug. 25, 2022

(51) Int. Cl.
*H04B 7/06*    (2006.01)
*H01Q 21/00*    (2006.01)
(Continued)

(52) U.S. Cl.
CPC ....... *H04B 7/0691* (2013.01); *H01Q 21/0025* (2013.01); *H01Q 21/065* (2013.01); *H04B 1/0475* (2013.01)

(58) Field of Classification Search
CPC ................ H04B 7/0691; H04B 1/0475; H01Q 21/0025; H01Q 21/065
(Continued)

(56) References Cited

U.S. PATENT DOCUMENTS

| | | | |
|---|---|---|---|
| 6,697,436 B1 | 2/2004 | Wright et al. | |
| 7,280,848 B2 * | 10/2007 | Hoppenstein | ......... H01Q 23/00 455/562.1 |

(Continued)

FOREIGN PATENT DOCUMENTS

| | | |
|---|---|---|
| CN | 108292926 A | 7/2018 |
| WO | 2018/067969 A1 | 4/2018 |
| WO | WO 2019/240815 A1 | 12/2019 |

OTHER PUBLICATIONS

International Search Report and Written Opinion dated Jan. 29, 2019 corresponding to International Patent Application No. PCT/US2018/050165.
(Continued)

*Primary Examiner* — Emmanuel Bayard
(74) *Attorney, Agent, or Firm* — Squire Patton Boggs (US) LLP

(57) ABSTRACT

Systems, methods, apparatuses, and computer program products for array antenna adaptive digital pre-distortion with Bayesian observation analysis are provided. One method may include selecting a plurality of patch elements from an array antenna of a network element. The method may also include determining an accuracy confidence value for each patch element. A set of coefficients of the antenna array may be generated. In addition, an ensemble of non-linear forward models may be generated using the accuracy confidence value and the set of coefficients. Further, an array of pre-distortion signals may be generated using the ensemble of non-linear forward models, and each antenna of the array antenna may be configured with a corresponding pre-distortion signal from the array of pre-distortion signals.

14 Claims, 16 Drawing Sheets

(51) Int. Cl.
*H01Q 21/06* (2006.01)
*H04B 1/04* (2006.01)

(58) Field of Classification Search
USPC .................................................. 375/295–297
See application file for complete search history.

(56) References Cited

U.S. PATENT DOCUMENTS

| 10,075,201 B1* | 9/2018 | Gazneli .................. H03F 3/195 |
| 2006/0133535 A1 | 6/2006 | Jung et al. |
| 2011/0235749 A1 | 9/2011 | Kenington |
| 2019/0198999 A1* | 6/2019 | Ashrafi .................. H01Q 25/04 |

OTHER PUBLICATIONS

Chinese Office Action issued in corresponding Chinese Patent Application No. 201880097403.9 dated Oct. 29, 2021.

* cited by examiner

FIG. 2

Array 8x8 HOR

FIG. 6

ARRAY ANTENNA ADAPTIVE DIGITAL PRE-DISTORTION WITH BAYESIAN OBSERVATION ANALYSIS

FIELD

Some example embodiments may generally relate to mobile or wireless telecommunication systems, such as Long Term Evolution (LTE) or fifth generation (5G) radio access technology or new radio (NR) access technology, or other communications systems. For example, certain embodiments may relate to array antenna adaptive digital pre-distortion (DPD) techniques with Bayesian observation analysis.

BACKGROUND

Examples of mobile or wireless telecommunication systems may include the Universal Mobile Telecommunications System (UNITS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. Fifth generation (5G) or new radio (NR) wireless systems refer to the next generation (NG) of radio systems and network architecture. It is estimated that NR will provide bitrates on the order of 10-20 Gbit/s or higher, and will support at least enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. It is noted that, in 5G or NR, the nodes that can provide radio access functionality to a user equipment (i.e., similar to Node B in E-UTRAN or eNB in LTE) may be referred to as a next generation or 5G Node B (gNB).

SUMMARY

One embodiment may be directed to a method, which may include selecting a plurality of patch elements from an array antenna of a network element, determining an accuracy confidence value for each patch element, and generating a set of coefficients of the array antenna. Further, an ensemble of non-linear forward models may be generated using the accuracy confidence value and the set of coefficients. In addition, an array of pre-distortion signals may be generated using the ensemble of non-linear forward models, and each antenna of the array antenna may be configured with a corresponding pre-distortion signal from the array of pre-distortion signals.

In an example embodiment, the method may also include obtaining model weights for the array antenna. In a further example embodiment, selecting the plurality of patch elements may include selecting at least four different patch elements.

In an example embodiment, the determining the accuracy confidence value may be based on build data of each antenna of the array antenna, and the configuring may include linearizing the array antenna with the pre-distortion signal. According to another example embodiment, the determining the accuracy confidence value may include implementing a Bayesian formula.

Another embodiment may be directed to an apparatus. The apparatus may include at least one processor, and at least one memory including computer program code. The at least one memory and computer program code may be configured, with the at least one processor, to cause the apparatus at least to select a plurality of patch elements from an array antenna of a network element, determine an accuracy confidence value for each patch element, and generate a set of coefficients of the array antenna. The apparatus may further be caused to generate an ensemble of non-linear forward models using the accuracy confidence value and the set of coefficients, generate an array of pre-distortion signals using the ensemble of non-linear forward model, and configure each antenna of the array antenna with a corresponding pre-distortion signal from the array of pre-distortion signals.

In an example embodiment, the apparatus may be caused to obtain model weights for the array antenna. In another example embodiment, the apparatus may be caused to select at least four different patch elements. In a further example embodiment, the determining the accuracy confidence value may be based on build data of each antenna of the array antenna.

In an example embodiment, the apparatus may be caused to linearize the array antenna with the pre-distortion signal, and implement a Bayesian formula in determining the accuracy confidence value.

Another embodiment may be directed to an apparatus, which may include circuitry configured to select a plurality of patch elements from an array antenna of a network element, circuitry configured to determine an accuracy confidence value for each patch element, and circuitry configured to generate a set of coefficients of the array antenna. The apparatus may also include circuitry configured to generate an ensemble of non-linear forward models using the accuracy confidence value and the set of coefficients, circuitry configured to generate an array of pre-distortion signals using the ensemble of non-linear forward models, and circuitry configured to configure each antenna of the array antenna with a corresponding pre-distortion signal from the array of pre-distortion signals.

Another embodiment may be directed to an apparatus, which may include means for selecting a plurality of patch elements from an array antenna of a network element, means for determining an accuracy confidence value for each patch element, and means for generating a set of coefficients of the array antenna. The apparatus may also include means for generating an ensemble of non-linear forward models using the accuracy confidence value and the set of coefficients, means for generating an array of pre-distortion signals using the ensemble of non-linear forward models, and means for configuring each antenna of the array antenna with a corresponding pre-distortion signal from the array of pre-distortion signals.

Another embodiment may be directed to a non-transitory computer readable medium, which may include program instructions stored thereon for performing the functions of any one or more of the various embodiments described above.

BRIEF DESCRIPTION OF THE DRAWINGS

For proper understanding of the invention, reference should be made to the accompanying drawings, wherein:

FIG. 2 illustrates a 64-element antenna array 8×8 according to an example embodiment.

FIG. 6 illustrates a full array horizontal-vertical (HOR-VER) 2×64 element patch according to an example embodiment.

DETAILED DESCRIPTION

Figure 1:
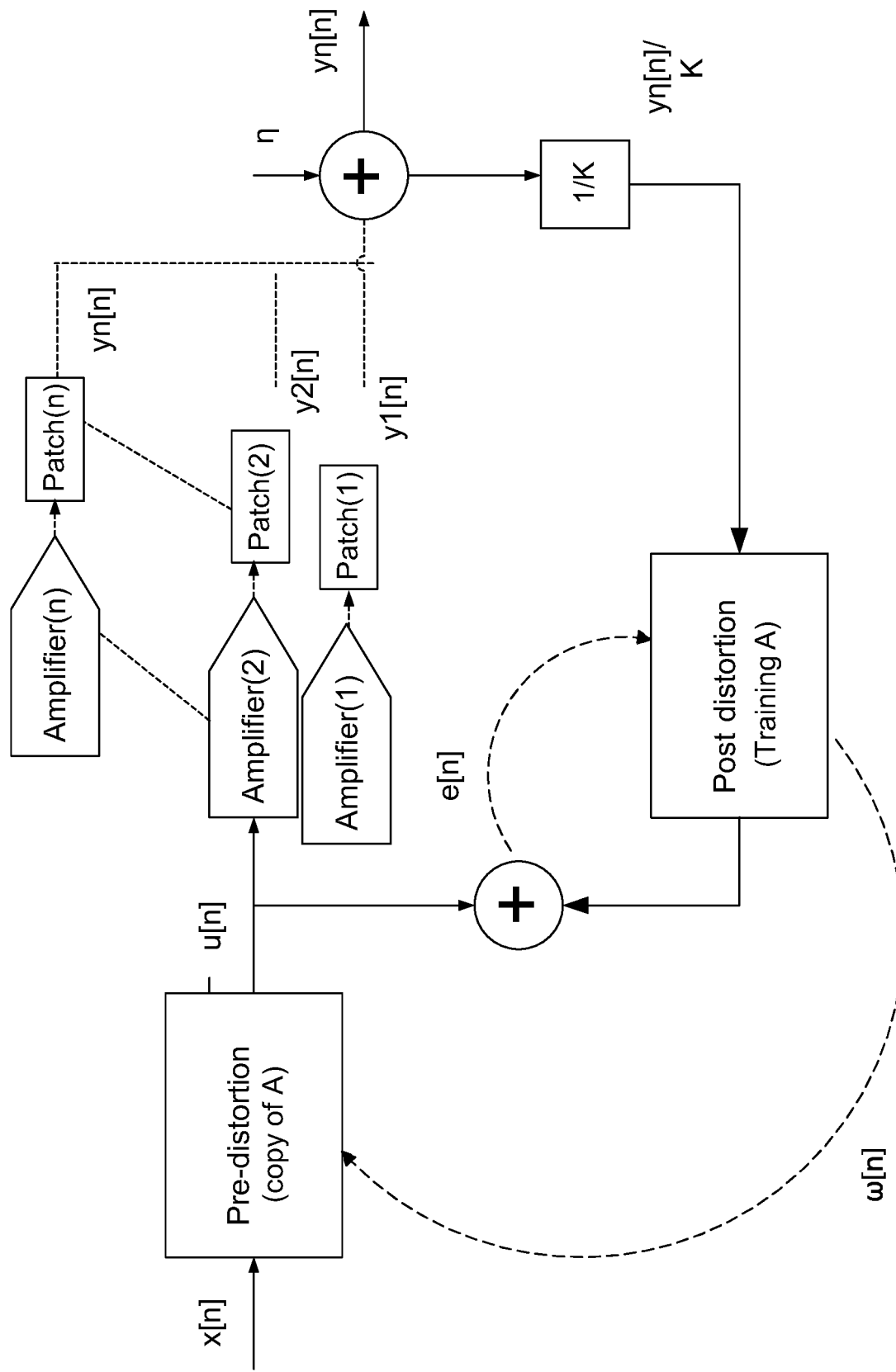
FIG. 1 illustrates an array antenna adaptive digital pre-distortion (DPD) with one observation path according to an example embodiment.

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for array antenna adaptive digital pre-distortion (DPD) with Bayesian observation analysis, is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "an example embodiment," "some embodiments," or other similar language, throughout this specification refers to the fact that a particular feature, structure, or characteristic described in connection with an embodiment may be included in at least one embodiment. Thus, appearances of the phrases "in certain embodiments," "an example embodiment," "in some embodiments," "in other embodiments," or other similar language, throughout this specification do not necessarily all refer to the same group of embodiments, and the described features, structures, or characteristics may be combined in any suitable manner in one or more example embodiments.

Additionally, if desired, the different functions or steps discussed below may be performed in a different order and/or concurrently with each other. Furthermore, if desired, one or more of the described functions or steps may be optional or may be combined. As such, the following description should be considered as merely illustrative of the principles and teachings of certain example embodiments, and not in limitation thereof.

5G base stations may use active antenna arrays for beam forming. Design factors such as Equivalent Isotropic Radiated Power (EIRP), cost, power dissipation, and heat generation may lead to using digital pre-distortion (DPD) techniques to alleviate issues with cost and power dissipation.

The DPD technique may be used offline or in real-time. Real-time DPD may also be known as adaptive DPD, which may require using a feedback observation path from antenna patches in an antenna array. Since sampling antenna outputs at microwave (39 GHz) may be very difficult, in practice, only a few outputs may be sampled for a DPD observation path.

A problem may arise in sampling antenna outputs in that only a few antennae that are sampled within the array may not be a valid representation (with high confidence) of the entire array due to build process issues such as soldering voids, lot to lot variation, and others. This may result in a lack of confidence on the observation path and, thus, lack of confidence on the accuracy of the DPD model. Accordingly, a method is needed to calculate the confidence on the observation path using the build statistics.

FIG. 1 illustrates an array antenna adaptive DPD with one observation path according to an example embodiment. Use of the DPD technique may provide significant cost and power consumption savings. Further, real-time DPD may require using a reliable feedback path to provide a reliable DPD model for the entire array. In an example embodiment, a solution for array antenna adaptive DPD may include sampling from all N×N antenna outputs to provide N×N DPD models to be applied to each N×N amplifiers. However, such an approach may not be practical. An alternate method may include sampling one antenna, such as an antenna illustrated in FIG. 1, to provide the DPD model and use for the entire array. In doing so, however, there may arise a problem in the single element observation, which leads to very low confidence on accuracy of the model provided. In an example embodiment, a method may be provided to obtain high confidence of observation accuracy by sampling n different antenna patches, such as, for example, n<8, to achieve confidence up to 99.9% for the acquired DPD model.

As illustrated in FIG. 1, a multiplicity of RFIC may be used in an active antenna array. This characteristic may require a modified DPD linearization technique to linearize single amplifiers. However, a problem in adaptive DPD in mmWave 5G systems with array antenna is the method of observation (or feed-back path). Normally, the observation path may be needed to sample each amplifier's output, which may be used for model estimation. Since the 5G operating frequency is very high, such as for example, at 39 GHz, the path antenna elements with their associated power amplifiers may lead to a high-density layout. Further, the addition of couplers to observe each of the output signals and then routing those observations to receivers may be problematic. Alternatively, it may be possible to observe the output of the entire array using Over the Air (OTA) (or induced) coupling. Such an OTA may be a method of measurement in which the measurement (observation) is done by using a received antenna, such as a horn antenna, at a certain distance from a transmit antenna, where a far field measurement would be valid. Induced measurement (observation), on the other hand, may be a measurement in which the observation is done using a coupler placed at an output of the Transmit RFIC power amplifier (PA). However, the challenges here may be that the real-time OTA method may not be practical. In addition, the near field observation may have an inherent discrepancy to far field results.

Observing a single or a few elements may not be a true representation of the actual RFIC due to process build issues that may yield a low confidence real time model. Thus, to resolve such issues in the active antenna array system, certain example embodiments may provide techniques to analyze the confidence of the model provided from a specific observation path. Once a high confidence such as 99.8% is achieved, the model may be used to generate an ensemble model.

Figure 2:
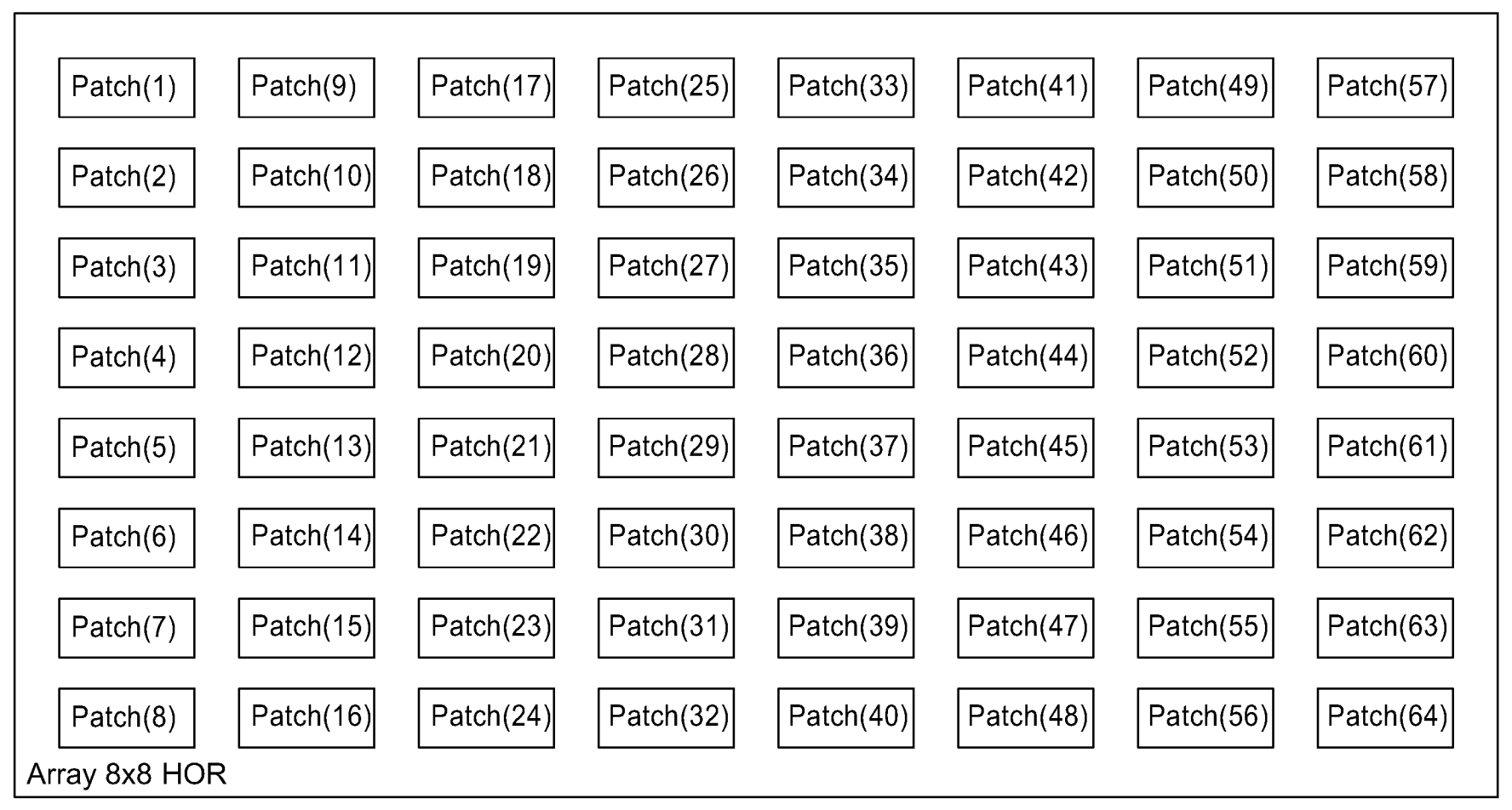

FIG. 2 illustrates a 64-element antenna array 8×8 according to an example embodiment. As illustrated in FIG. 2, various combinations of a number of patches may be sampled. For example in an example embodiment, it may be possible to sample three or four patches, such as patch (1), patch (8), patch (57), and patch (64) for an observation path. The criteria for patch selection may include correlation of observations. Achieving a valid statistical result may force observation of patches with maximum spatial separation, hence less correlated observations.

Figure 3:
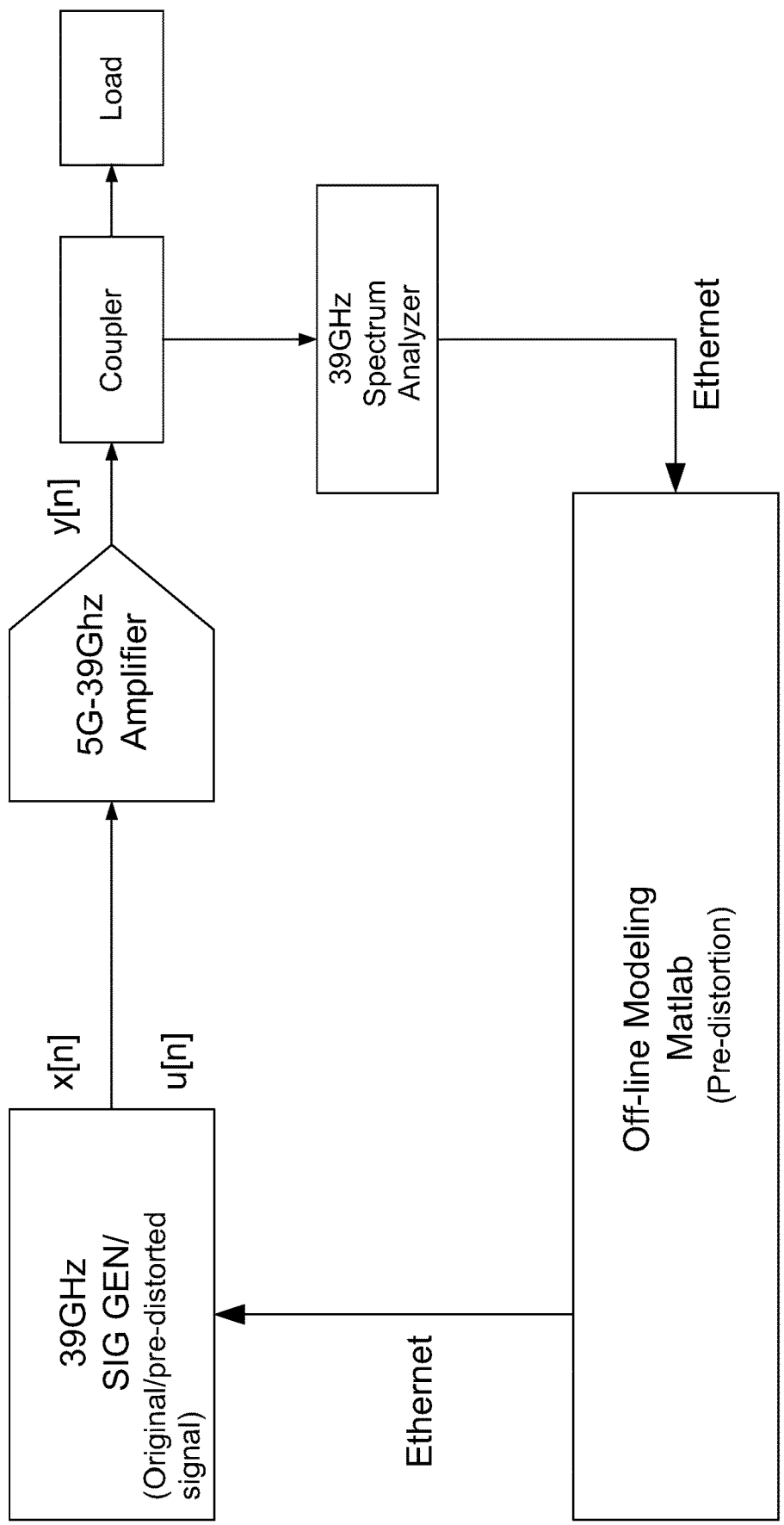
FIG. 3 illustrates a standard high confidence DPD model using RFIC error vector magnitude (EVM) according to an example embodiment.

Once the observations are made, using initial build statistics and conditional probability with the Bayesian Theorem shown in equation (1) and (2), it may be possible to calculate the confidence level of this observation against a model acquired using a standard radio frequency integrated circuit (RFIC) platform. For example, FIG. 3 illustrates a high confidence DPD model using RFIC error vector magnitude (EVM) according to an example embodiment. The confidence level of the observation with equations (1) and (2) against the model acquired using an RFIC platform illustrated in FIG. 3 may be very high, in the range of about 99.9%. As shown in equations (1) and (2), H and E represent the Hypothesis and Event, respectively. Eventually, every next observation may increase in confidence level exponentially toward 99.9% after, for example, three or four observations.

$$P(H \mid E) = \frac{P(E \mid H) * P(H)}{P(E)} \quad (1)$$

$$P(H \mid E) = \frac{P(E \mid H) * P(H)}{P(H) * P(E \mid H) + P(-H) * P(E \mid -H)} \quad (2)$$

In an example embodiment, DPD models may have a high confidence level of accuracy using only four observations based on Bayesian statistics. However, in other embodiments, the number of observations based on Bayesian statistics may vary, and may be more or less than four observations. An example embodiment may provide an analysis method to achieve high confidence in real-time DPD modeling using a few observations rather than sampling entire power amplifiers used in active antenna arrays.

Figure 4:
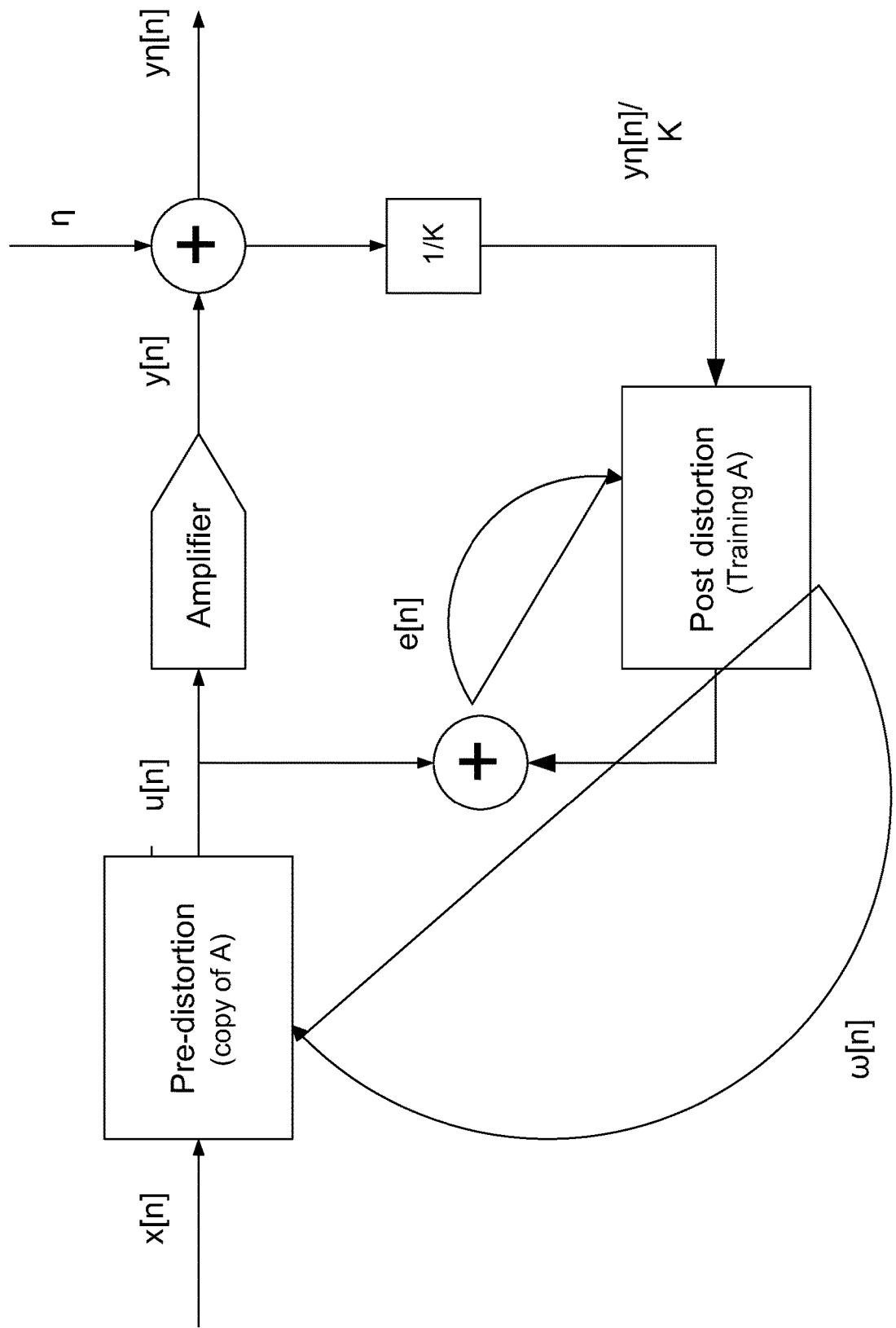
FIG. 4 illustrates a general from of an indirect learning algorithm (ILA) according to an example embodiment.

FIG. 4 illustrates a general from of an indirect learning algorithm (ILA) according to an example embodiment. The ILA algorithm may be intended for single amplifier linearization. In an example embodiment, a variation of the ILA algorithm may be based on Bayesian statistical analysis, which may be suitable for linearization for an array of RFIC, and may be used in an active antenna array.

Figure 5:
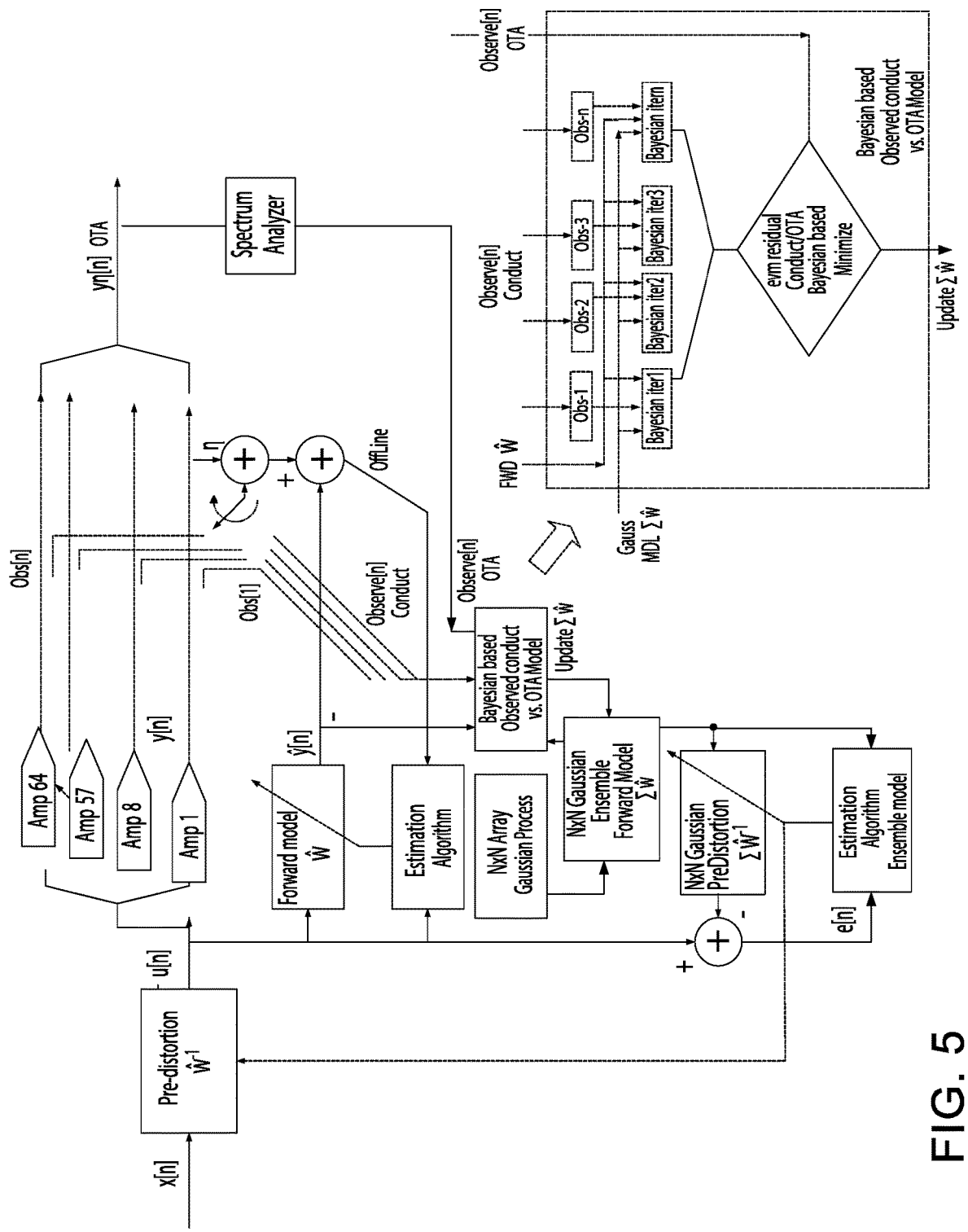
FIG. 5 illustrates a Bayesian based Gaussian process DPD N×N array algorithm according to an example embodiment.

FIG. 5 illustrates a Bayesian based Gaussian process DPD N×N array algorithm according to an example embodiment. Specifically, FIG. 5 illustrates a general form of ILA, and derivation of the forward model for a single PA using standard RFIC EVM. In addition, a confidence level of an observation path using Bayesian statistics may be analyzed, and an appropriate model for a single PA element to maintain EVM (off-line OTA) while minimizing residual EVM with respect to OTA (measured SA) may be provided. Since the array antenna may include a plurality of PAs, and the model for each PA may be slightly different than other PAs, the overall model for the array may contain an uncorrected residual error (EVM). In certain example embodiments, the residual error obtained may be in the order of 0.5 to 1%. The desirable residual error in certain example embodiments may be 0%.

Further, as illustrated in FIG. 5, an internal structure of Bayesian block may be provided, and a set of N×N Gaussian process coefficients may be generated. FIG. 5 also illustrates use of a Bayesian based forward model with the N×N Gaussian coefficients to generate an ensemble of Gaussian non-linear forward models. For instance, in an example embodiment, at each iteration, once the single PA model coefficients are obtained based on the Bayesian method, the pertinent Gaussian set may be generated accordingly, and the results may be compared against the OTA. In an example embodiment, an N×N array of pre-distortion signals may be generated using an ensemble of Gaussian forward models. For instance, at each iteration, once the Bayesian based model for a single PA is obtained, the pertinent pre-distorted signal and Gaussian ensemble may be calculated.

In an example embodiment, a derivation of a Volterra series non-linear modeling technique may be provided, which considers polynomial order K, and memory length Q&M. Here, Q and M may represent the memory depth (delay tap depth) for linear and power terms respectively. An estimate of a forward model $\hat{y}[n]$ of the RFIC amplifier may be derived as follows:

$$y(n) = \sum_{k=0}^{K-1} \cdot \sum_{m=0}^{M-1} \cdot \sum_{q=0}^{Q-1} a_{2k+1,q,m} \cdot x(n-q, m) \cdot |x(n-q, m)|^{2k} \quad (3)$$

In equation (3), K is the order of power terms (non-linear terms), q is the memory delay tap length for linear terms, m is memory delay tap length for nonlinear terms and "$a_{2k+1,q,m}$" represents the model coefficients for each term.

Equation (3) provides the amplifier model's coefficients $\alpha_{2k+1,q}$, which are herein referred to as $\hat{w}$. The inverse model coefficients $\hat{w}^{-1}$ may be obtained using matrix inversion. However, in certain example embodiments, the indirect learning method may be used for inverse model estimation.

According to an example embodiment, a Bayesian based model-observation validation procedure may be provided. For instance, an adaptive DPD array algorithm for 5G base stations with confidence level analysis of observations using Bayesian statistics may be provided. In some example embodiments, the model provided from the individual PA (conducted observation path) may be compared with respect to a model obtained from OTA measured results. Then, it may possible to adaptively maintain a comparable performance (EVM) with respect to OTA characterization.

Figure 6:
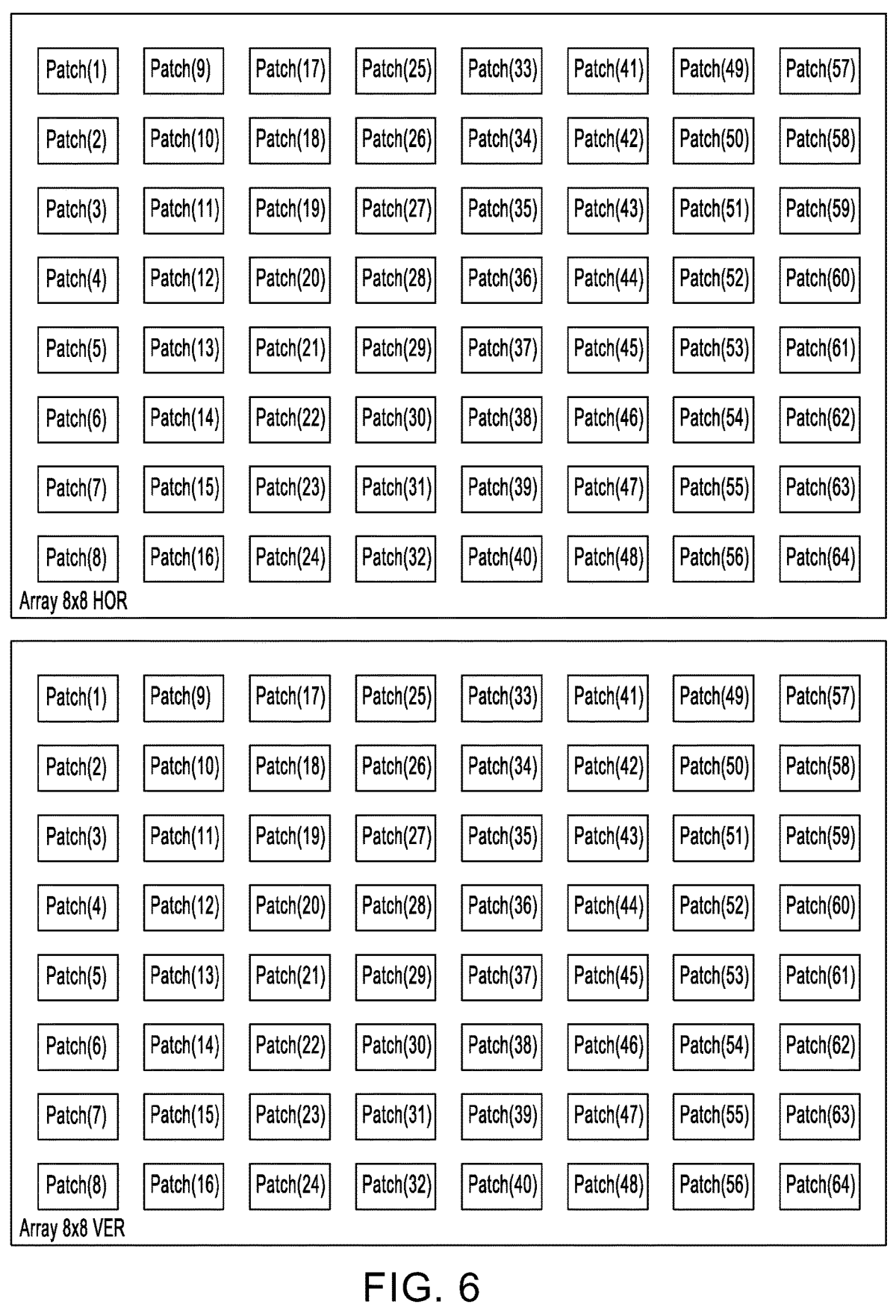

FIG. 6 illustrates a full array horizontal-vertical (HOR-VER) 2×64 element patch according to an example embodiment. Considering the array antenna illustrated in FIG. 6, although various combinations of patch elements may be selected, patch elements (25), (8) of HOR, and (57), (40) of VER may be selected for an observation path. This may provide nearly max spatial distance between elements, which may suggest that the observed signals are less correlated. In an example embodiment, performing a Bayesian analysis may require a-priori knowledge of the process under question. This information may be derived from several means by considering build data, including, for example, X-Rays, RFIC lot history, defect ratio, etc. Once the observation of each patch is done, the accuracy confidence of the obtained model may be examined against the uncertainty of observation, which in turn may be computed with considering the process uncertainty, measuring equipment, and final measurement uncertainty that may obey the root sum square (RSS) given that they are independent. This returns uncertainty $\sigma_t$ which is shown below, where $\sigma_T$ is total uncertainty, $\sigma_P$ is process, and $\sigma_M$ is measurement uncertainty.

$$\sigma_T^2 = \sigma_P^2 + \sigma_M^2 + \quad (4)$$

Using the Bayesian formula, a-posteriori knowledge may be calculated as follows:

$$P(H \mid E) = \frac{P(E \mid H) * P(H)}{P(H) * P(E \mid H) + P(-H) * P(E \mid -H)} \quad (5)$$

Here, P(H) represents the probability that the observation is correct, P(E) represents the probability that the test result is positive, P(−H) represents the probability that the observation is false, and P(−E) represents the probability that the test result is negative.

In an embodiment, an initial guess for a-priori knowledge may be from the build process (e.g., Process Yield=70%). In addition, an observation certainty may be about 0.621 obtained from simulation results shown in Table 1 (sum4 certainty). This equation may yield a-posteriori knowledge as follows:

$$P(H \mid E) = \frac{0.621 * 0.7}{0.7 * 0.621 + 0.3 * 0.379} = 0.7927 \quad (6)$$

TABLE 1

Confidence of observations (array of PA exhibits EVM occurrence with exponential distribution)

| Observation | E[xλ exp(−λx)] | λ | var | Certainty |
|---|---|---|---|---|
| Single | 2.391 | 0.418 | 5.717 | 0.418 |
| Sum2 | 1.989 | 0.503 | 3.956 | 0.503 |
| Sum3 | 1.624 | 0.616 | 2.637 | 0.616 |
| Sum4 | 1.611 | 0.621 | 2.595 | 0.621 |

According to an example embodiment, at a first observation shown in equation (6), there may only be about a 79% chance that the observation/model is true. Next, observation from feedback point (sum4) may be as follows:

$$P(H \mid E) = \frac{0.621 * 0.7927}{0.7927 * 0.621 + 0.2073 * 0.379} = 0.8623 \quad (7)$$

In another example embodiment, at a second observation shown in equation (7), there may only be about an 86% chance that the observation/model is true. In a further example embodiment, the next observation may be from a feedback point, which may result in the following shown in equation (8):

$$P(H \mid E) = \frac{0.621 * 0.8623}{0.8623 * 0.621 + 0.1377 * 0.379} = 0.9112 \quad (8)$$

As shown in equation (8), at a third observation, there is about a 91.1% chance that the observation/model is true. In another example embodiment, a fourth observation from a feedback point may result in the following as shown in equation (9):

$$P(H \mid E) = \frac{0.621 * 0.9112}{0.9112 * 0.621 + 0.0888 * 0.379} = 0.94388 \quad (9)$$

As shown in equation (9), in a fourth observation, there may be about a 94.39% chance that the observation/model is true, which is a high confidence level of observation/model accuracy. In an example embodiment, the four different observations described above may be performed at different frequencies. Alternatively, in another example embodiment, the four different observations may be performed using different test signals so as to make them as independent as possible.

Figure 7:
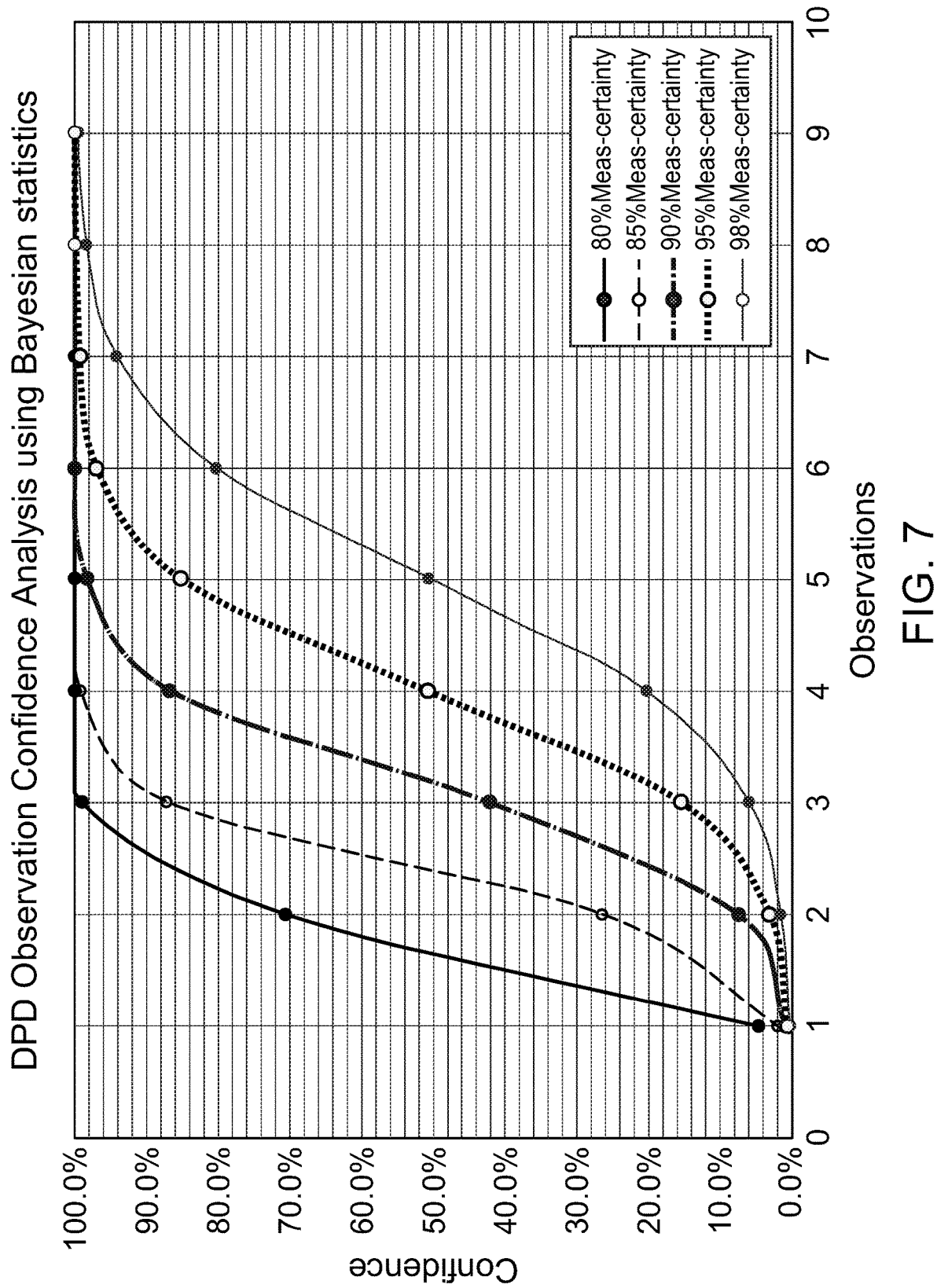
FIG. 7 illustrates a graphical representation of confidence level vs observation number for various process qualities according to an example embodiment.

FIG. 7 illustrates a graphical representation of confidence level vs observation number for various process qualities according to an example embodiment. As illustrated in FIG. 7, the DPD observation confidence analysis uses Bayesian statistics. FIG. 7 also illustrates results ranging from 80% measurement certainty to 98% measurement certainty. FIG. 7 also illustrates that the process with 98% certainty needs only three observations, whereas the loss process with 80% certainty needs eight observations to achieve a similar confidence level of DPD modeling.

According to an embodiment, it may be possible to obtain results of a coupler observation method versus an OTA method. Although in the practical environment, a real-time adaptive DPD may only utilize the coupler observation method, and the OTA method would not be practical, certain example embodiments may provide a method by which an adaptive DPD exploiting coupler observation would yield comparable, with high confidence, EVM results to EVM results obtained by the OTA method. In an example embodiment, simulations may be performed for a coupler observation path with a single PA, two, three, and four PA feedback paths. The EVM performance of individual PAs of the entire array, as well as OTA performance for each scenario may be obtained. Such performance is illustrated in FIGS. 8 to 13, respectively.

Figure 8:
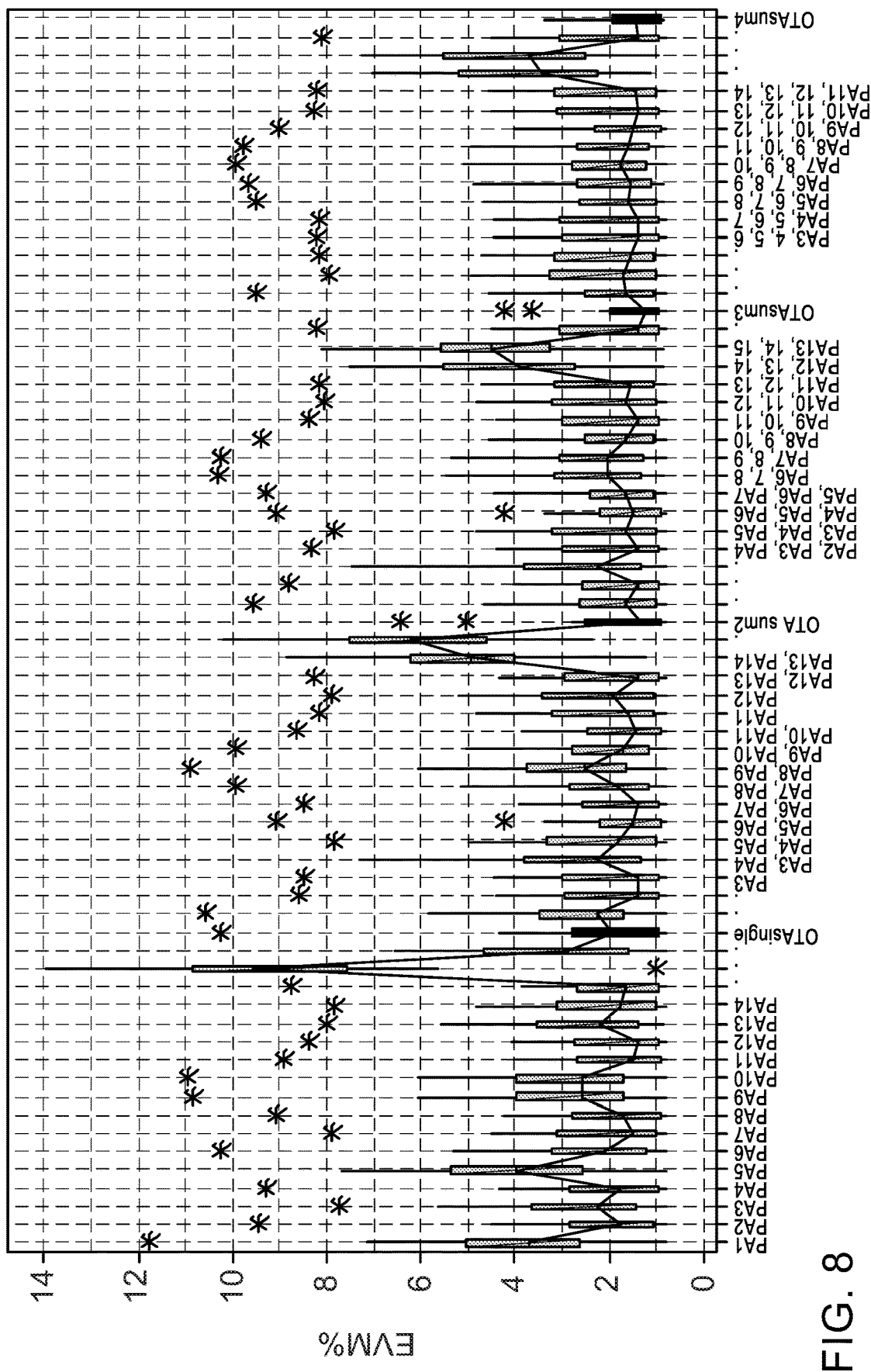
FIG. 8 illustrates an EVM performance of an entire array for various coupled observation scenarios according to an example embodiment.

FIG. 8 illustrates an EVM performance of an entire array for various coupled observation scenarios according to an example embodiment. In particular, FIG. 8 illustrates an EVM performance of an entire array for various coupled observation scenarios. In certain example embodiments, the observation scenarios may include, but not limited to: single PA; sum of 2 PA; sum of 3 PA; sum of 4 PA, respectively. In addition, FIG. 8 illustrates the EVM spread, and if the OTA observation path was used at each scenario. As can be seen in FIG. 8, the OTA observation path exhibits superior performance at each scenario.

Figure 9:
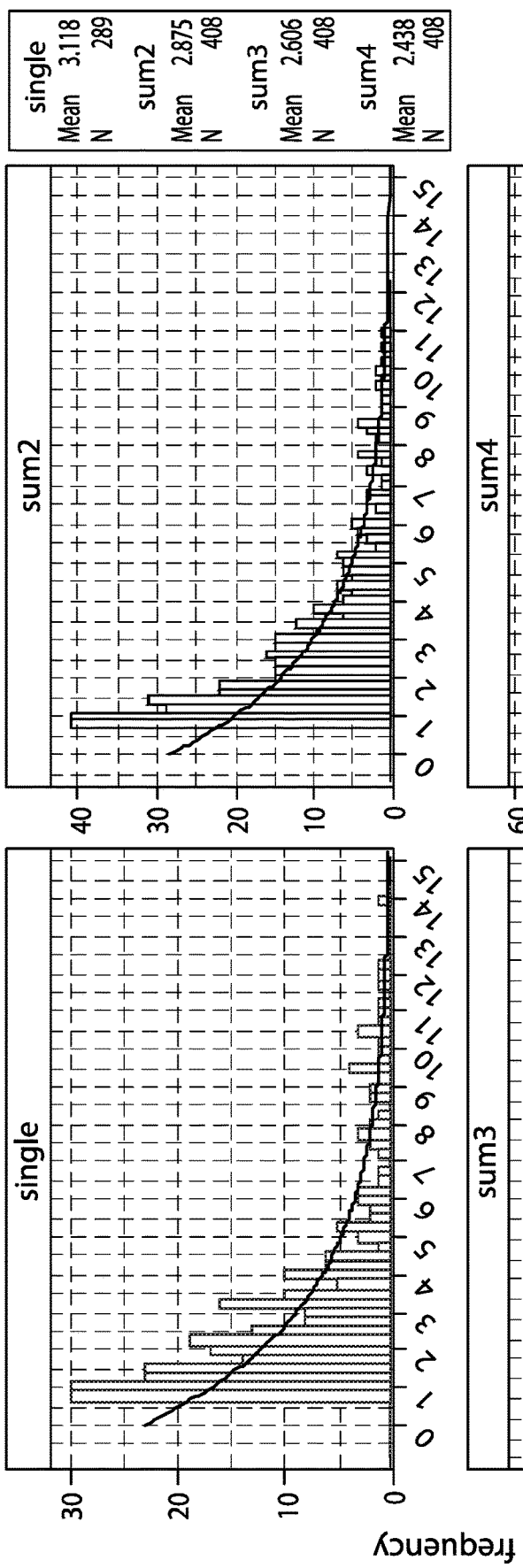
FIG. 9 illustrates a distribution of EVM for each coupler observation method according to an example embodiment.

FIG. 9 illustrates a distribution of EVM for each coupler observation method according to an example embodiment. In particular, FIG. 9 illustrates the distribution of EVM for each coupler observation method including, for example, single, sum2, sum3, and sum4, respectively. As can be seen from FIG. 9, sum4 exhibits exponential distribution with the lowest mean values among all. In an example embodiment, once the OTA observation method used for single, sum2, sum3 and sum4, a comparable distribution profile may be obtained.

Figure 10:
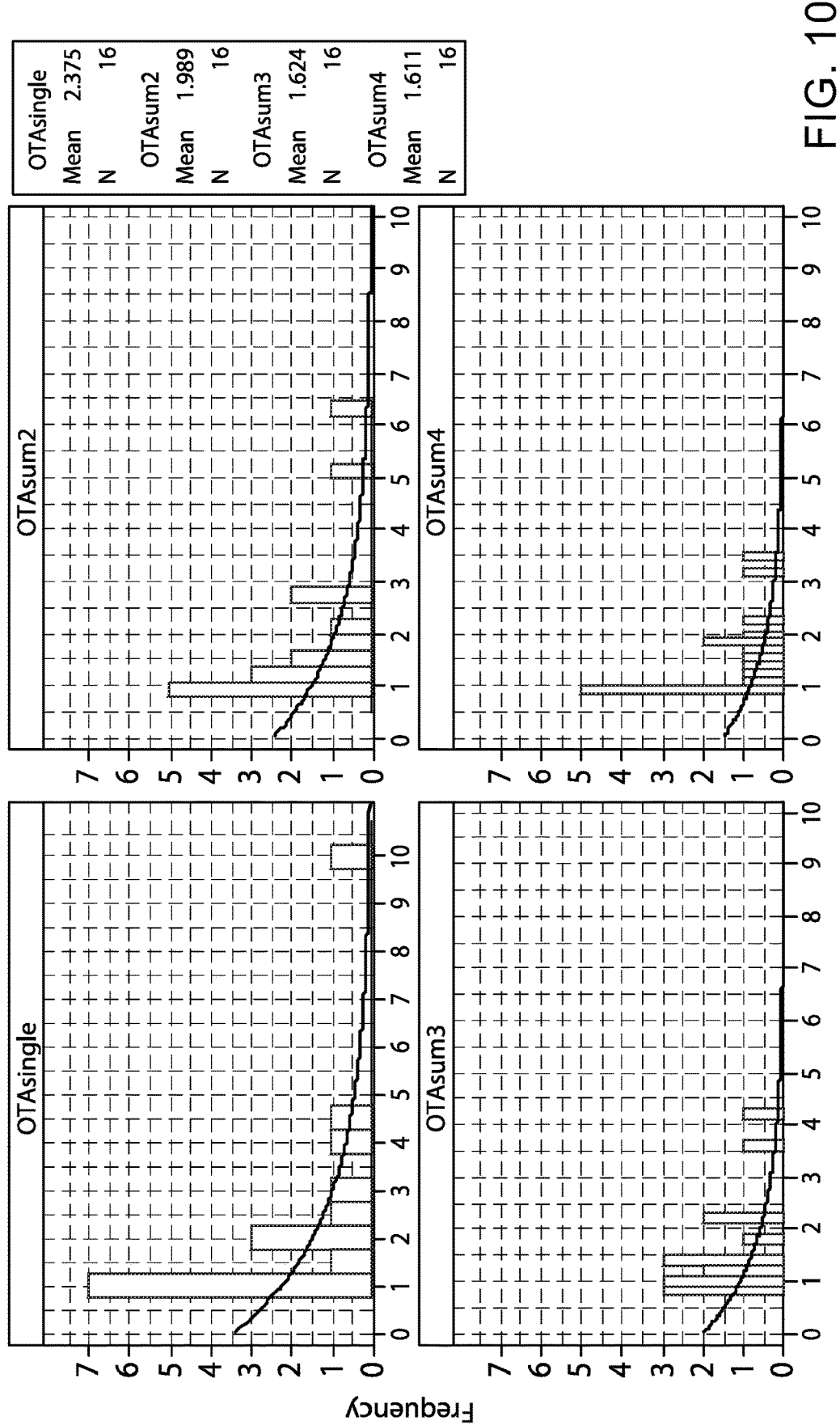
FIG. 10 illustrates a comparable distribution profile of OTA single, OTAsum2, OTAsum3, and OTAsum4 according to an example embodiment.
Figure 11:
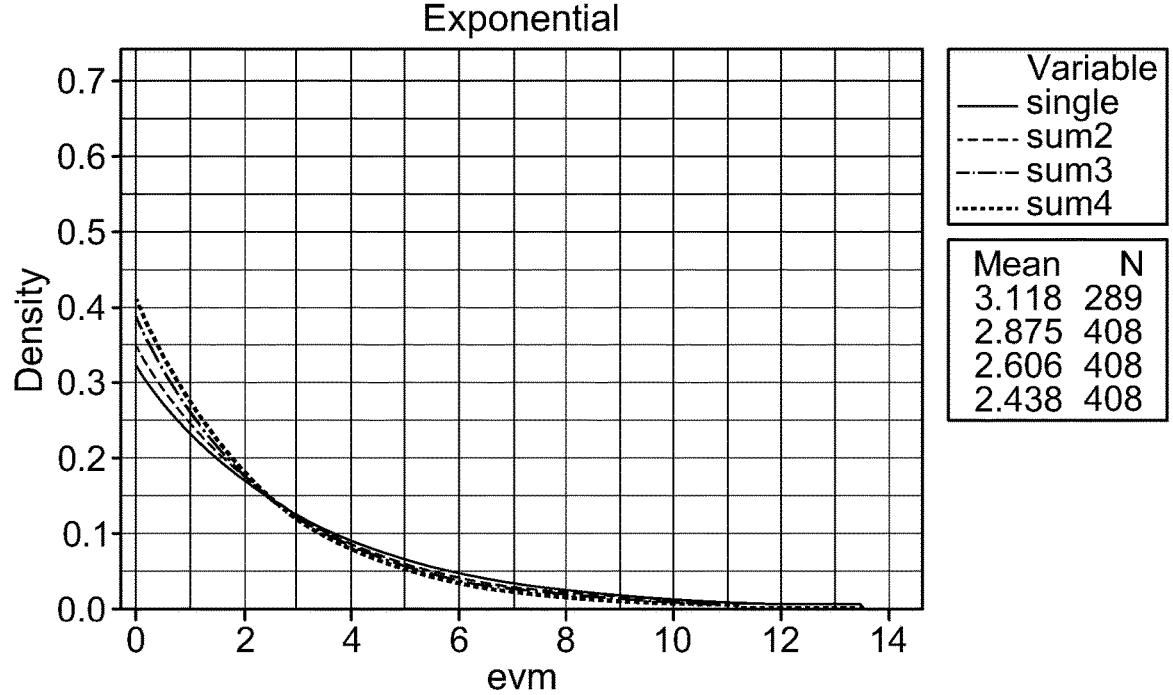
FIG. 11 illustrates an exponential distribution of EVM for coupled scenarios according to an example embodiment.

FIG. 10 illustrates a comparable distribution profile of OTA single, OTAsum2, OTAsum3, and OTAsum4 according to an example embodiment. Further, FIG. 11 illustrates an exponential distribution of EVM for coupled scenarios according to an example embodiment. In particular, FIG. 10 illustrates a comparable distribution profile obtained from observing the OTA observation method used for single, sum2, sum3, and sum4. The OTA shows a mean value much lower than that of the coupler observation, which emphasizes on the superiority of the OTA method against few coupler observations from PAs. Looking at the distribution results of OTAsum4, the EVM mean value ($1/\lambda$) reported as 1.611 is the minimum among other experiments.

Figure 12:
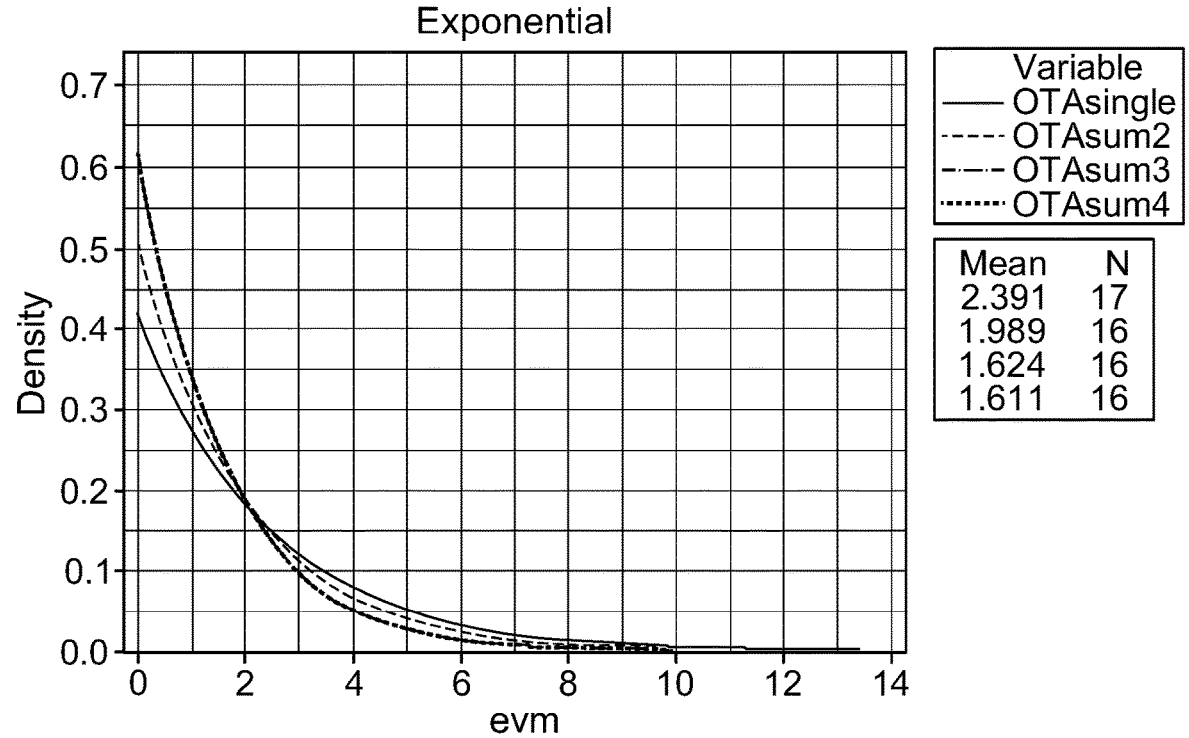
FIG. 12 illustrates an exponential distribution for OTA observation scenarios according to an example embodiment.
Figure 13:
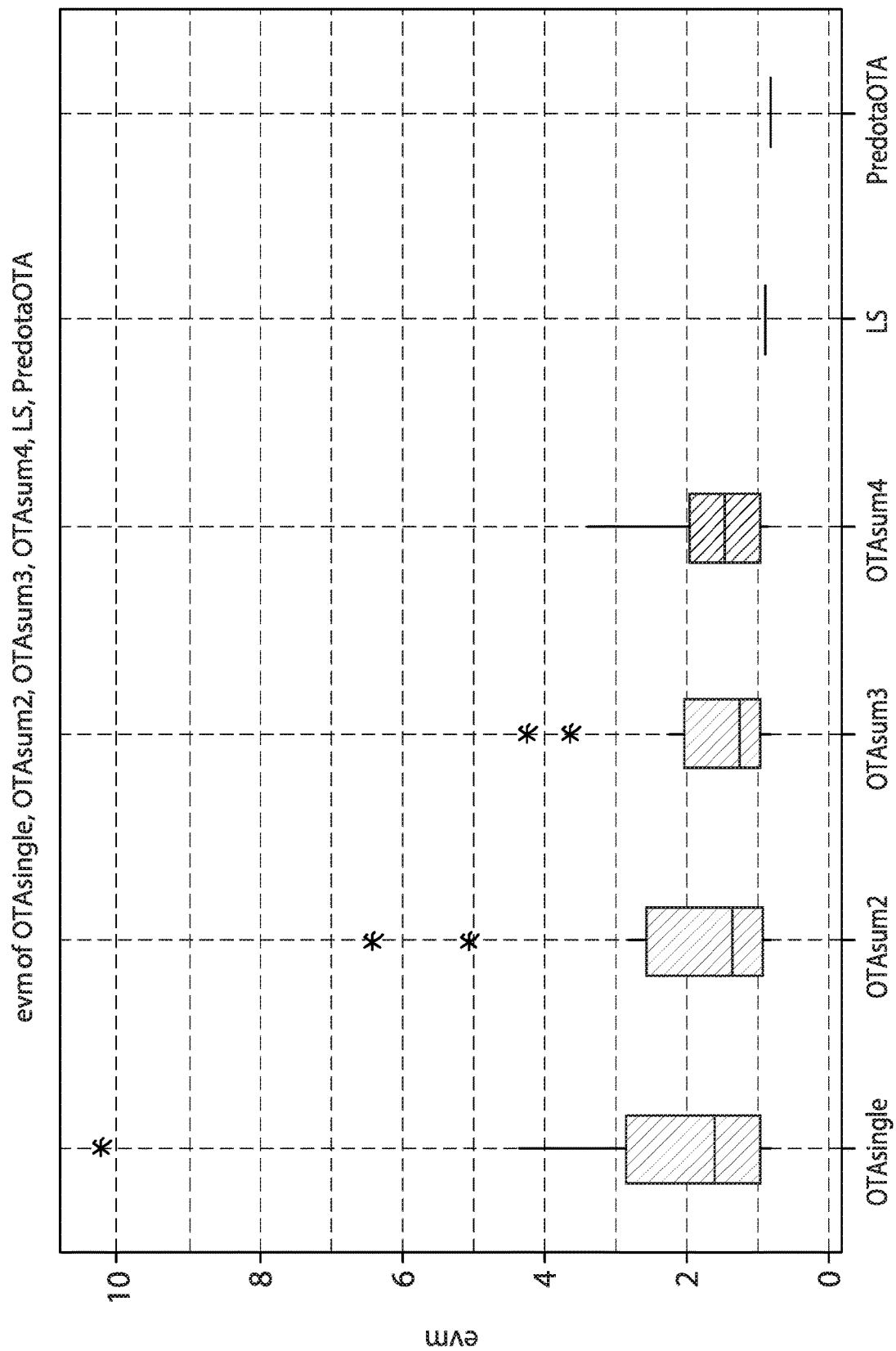
FIG. 13 illustrates an EVM range versus the number of observed PA used for adaptive DPD versus least square error (LS) (simulated) and OTA (measured) according to an example embodiment.

FIG. 12 illustrates an exponential distribution of EVM for coupled scenarios, and FIG. 12 illustrates an exponential distribution for OTA observation scenarios according to example embodiments. Further, FIG. 13 illustrates an EVM range versus the number of observed PA used for adaptive DPD versus least square error (LS) (simulated) and OTA (measured) according to an example embodiment. From properties of the exponential distribution, a variance ($1/\lambda^2$) may be derived. In an example embodiment, the certainty parameter of these experiments may be calculated. These parameters are listed in Table 1, which may be used for Bayesian analysis of these experiments, including, for example for case #4, which is sum4. In an example embodiment, the confidence level obtained from the Bayesian analysis may be used for calculating the final correction factor, which may later be applied to the model weights achieved by coupler observation against the OTA.

Figure 14:
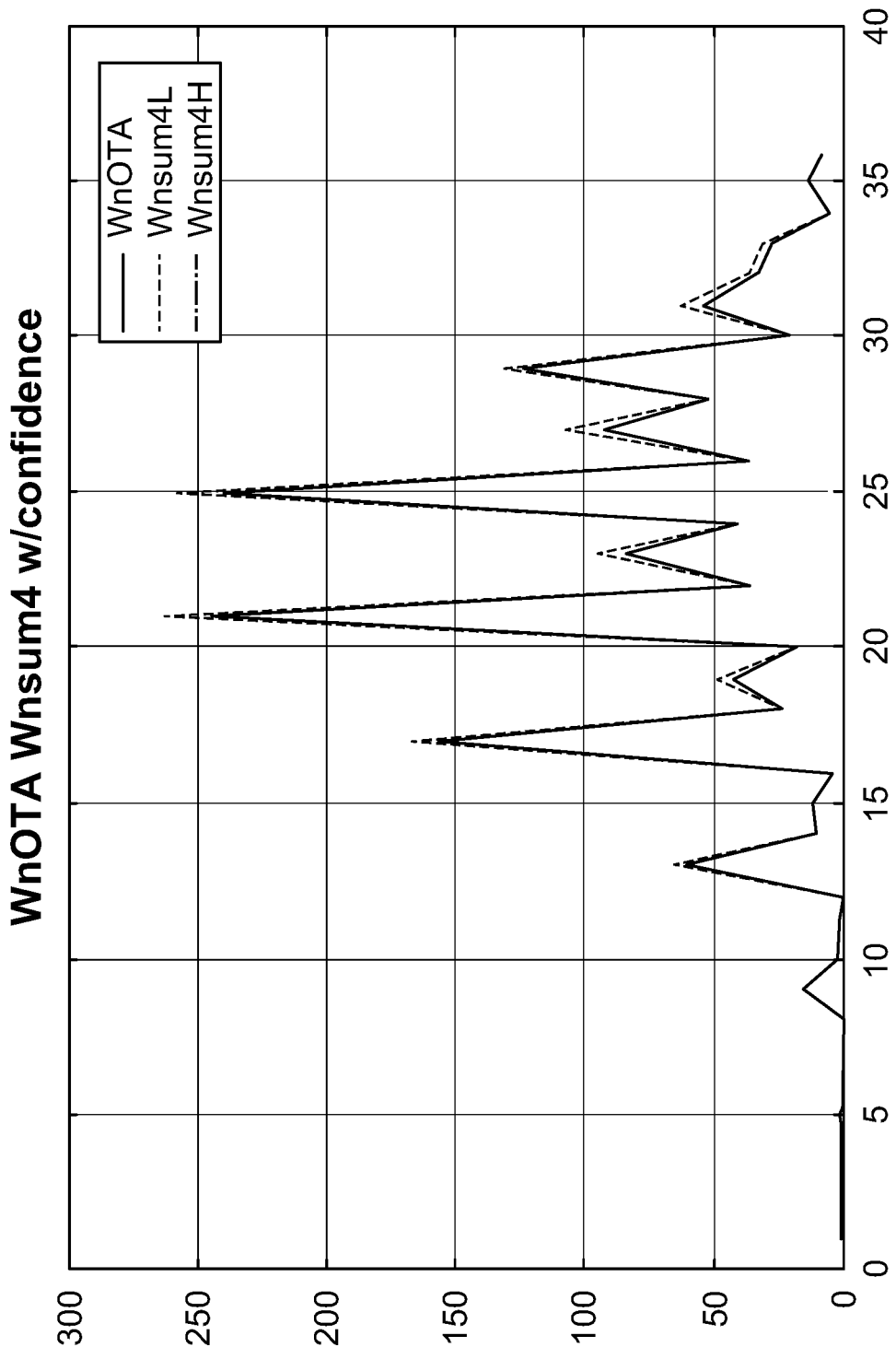
FIG. 14 illustrates a $W_{Sum4}$ with Bayesian confidence interval and WnOTA according to an example embodiment

With reference to FIG. 5, using the OTA observation path, the optimum model weights ($W_{OTA}$) for the array may be obtained and saved in non-volatile memory (NVM). Then, using the coupled sum4 path, the sub-optimal model weights ($W_{Sum4}$) may be obtained and saved into NVM. In an example embodiment, a correction factor may be derived from the ratio between the two model weights, and the correction factor may be applied to coupler model weight $W_{Sum4}$. In addition, the confidence level from the Bayesian analysis may be considered, which may be 94.4% rounded to approximately 95%. By multiplying the confidence level into the correction factor, lower and upper bounds for the coupled $W_{Sum4}$ model weights may be obtained, as shown in FIG. 14. In an example embodiment, the confidence levels may be calculated according to equation (9), wherein the resulting number may be multiplied to $W_n$ values. In particular, FIG. 14 illustrates a $W_{Sum4}$ with Bayesian confidence interval and WnOTA according to an example embodiment.

According to an example embodiment, all of the model weights $W_{OTA}$, $W_{Sum4}$, $W_{Sum4L}$, $W_{Sum4H}$, may be saved into NVM to be used during operation. According to certain example embodiments, the weights may be used based on a resulting performance metric (in this case error vector magnitude, evm) in real-time. The set of weights which produce the lowest EVM residue with respect to the OTA method may be selected. During operation, a proper set of weights between the lower and upper bounds may be interpolated and used in the form of a look up table (LUT).

In an example embodiment, a Gaussian yield process modeling may be performed after performing the Bayesian based validation. A challenge in adaptive DPD for an array antenna at 5G frequencies such as 39 GHz may be the observation path. This may be due to a number of reasons including, for example, because the OTA EVM performance is different from individual PA EVM. This may be inherent with an array of PA, multiple input multiple output/single input single output (MIMO/SISO). Thus, adaptively optimizing a single PA may not necessarily optimize an ensemble of PAs (OTA). Another reason may be that the conducted observation path (i.e., coupler) on all of the PAs at 39 GHz may not be practical. Thus, adaptive DPD optimization of all of the individual PAs may be extremely difficult, if not impossible (considering field programmable gate arrays (FPGA) resource needed).

According to certain example embodiments, an adaptive DPD algorithm for array antenna may be provided. The adaptive DPD algorithm for the array antenna may use a small number of PA output conducted observation path. In one example embodiment, the number of PA output conducted observation paths may be up to four.

In certain example embodiments, the adaptive DPD algorithm may include a design phase and a production/field trial phase. In the design phase, the OTA off-line DPD characterization of the array antenna may be in an open loop mode. While in the open loop mode, the OTA signal may be read using a spectrum analyzer (FIG. 5, observed OTA path). In addition, the OTA model weights may be provided, and an OTA pre-distortion may be generated. The OTA pre-distorted weights may then be applied to FPGA to linearize the array of the PA (FIG. 5, U[n]). Next, the steps of reading the OTA signal, providing the OTA model weights (OTA weights corresponding to $W_{OTA}$) and generating the OTA pre-distortion, and applying the OTA pre-distorted weights to the FPGA may be iterated (in each iteration, a new observation may be made based on the Bayesian method) to maintain an original EVM obtained off-line and to minimize residual EVM with respect to the EVM from the OTA.

In an example embodiment, the design phase may also include a closed loop mode, which uses conducted observations from 1, 2, 3, and 4 PAs (FIG. 5, Bayesian block, Obs1 to Obs4). In the closed loop mode, individual model weights may be obtained and adapted to maintain the OTA EVM result obtained in the open loop mode. This step may be repeated for other PAs to acquire high confidence based on Bayesian statistics in FIG. 7.

According to an example embodiment, the model weight may be estimated to satisfy certain conditions. One condition may be to maintain the OTA EVM. Another condition may be minimize residual EVM. The residual EVM may be minimized by multiplying the Bayesian confidence with the conducted weight/OTA weights. A third condition may be that the ultimate criteria is the monitored OTA EVM. Thus, adapted observation weights track OTA EVM in each iteration. In certain example embodiments, simulations showed as the number of observations during adaptive DPD increases, the EVM result approaches to that of weights obtained from the LS criteria. The Sum of 4 observed feedback provides comparable EVM to the LS, which has a residual error WRT to EVM from the OTA method (FIG. 13) Further, the NVM may be updated with a set of coefficients ơŵ accordingly.

As noted above, the adaptive DPD algorithm may also include a production/field trial phase. In this phase, the set of DPD weights generated during the design phase may be loaded into FPGA, including: off line OTA weights, which provide the best EVM performance at startup for the entire array. The set of DPD weights may also be loaded into FPGA, including the set of conducted observation updated weights. Further, in the production/field trial phase, chamber OTA characterization may be performed during production using SA & Matlab to provide a baseline DPD model.

Using the observation feedback of the single PA, a set of Gaussian weights may be generated. For instance, once the weights are obtained by the Bayesian method, those will be multiplied into the Gaussian coefficients. The generation of the set of Gaussian weights may be generated adaptively in FPGA while maintaining an EVM close to the OTA EVM (observed OTA in FIG. 5). In an example embodiment, the Bayesian theory described above may also show a simulation that as the number of observations used, the EVM emerges to EVM obtained by the LS criteria, and from the OTA method.

Figure 15:
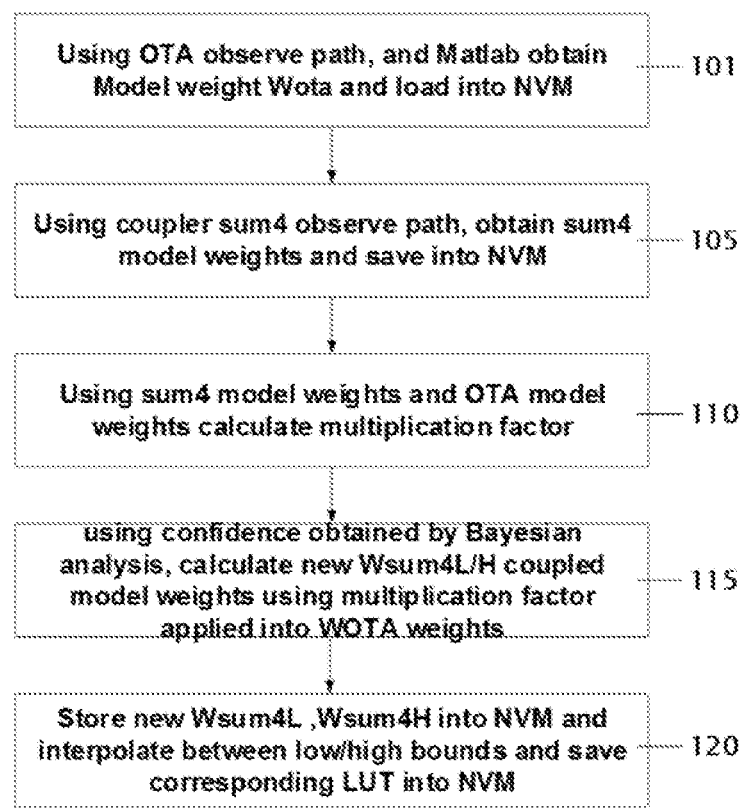
FIG. 15 illustrates an example flow diagram of a method of a model derivation sequence according to an example embodiment.

FIG. 15 illustrates an example flow diagram of a method of a model derivation sequence according to an example embodiment. At 101, the OTA may be used to observe a path, and Matlab may be used to obtain the model weight $W_{OTA}$ and loading the model weight into NVM. At 105, the coupler sum4 observed path may be used to obtain sum4 model weights and saved into NVM. At 110, the sum4 model weights and OTA model weights may be used to calculate a multiplication factor. For instance, the ultimate metric may be the EVM performance of OTA. Hence, the sum4 weights may be updated such that the resulting EVM becomes close to that obtained by the OTA method. Therefore, a multiplication number may be calculated by comparing OTA weights and sum4 weights. At 115, the confidence obtained by the Bayesian analysis may be used to calculate new $W_{Sum4L/H}$ coupled model weights using the multiplication factor applied into the $W_{OTA}$ weights. At 120, the new $W_{Sum4L}$, $W_{Sum4H}$ may be stored into NVM and interpolated between low/high bounds, and save corresponding LUT into NVM.

According to certain example embodiments, after the experiment has been repeated several times over several sets of Gaussian weights, the range of EVM variation (max-min) at each trial may decrease. This decrease may be due to a larger number of observed path used for weight generation. This is illustrated in FIG. 9 where the EVM box plot for each number of observation 1, 2, 3, and 4 gradually gets smaller, while minimizing the range of variation at each trial. In an example embodiment, simulation shows that using four observed path provides EVM results comparable to that of LS criteria. At the same time, it is comparable to EVM obtained from the OTA observation method.

As illustrated in FIG. 9, adaptive DPD using few observation paths may not be an optimal solution, and an average residual error EVM may exist at around 2%-2.5% (the max EVM bound may be higher). In addition, FIG. 13 illustrates that the OTA observation method has a residual error of around 1%. As shown by the Bayesian validation, the larger number of observation paths (up to 4) may produce enough confidence (FIGS. 9 and 13). This may produce a smaller bound at Observation #4, which is close to that of EVM from the OTA method.

In certain example embodiments, a simulation over an array size of 16 may show that adaptive DPD minimizes the EVM residue (which may be repeatable with high confidence of about 94%) with an EVM comparable to that of OTA. Additionally, according to other example embodiments, adaptive close loop DPD using four observed paths may produce an overall EVM of about 2%. Although non-optimal, it is acceptable with high confidence.

Figure 16:
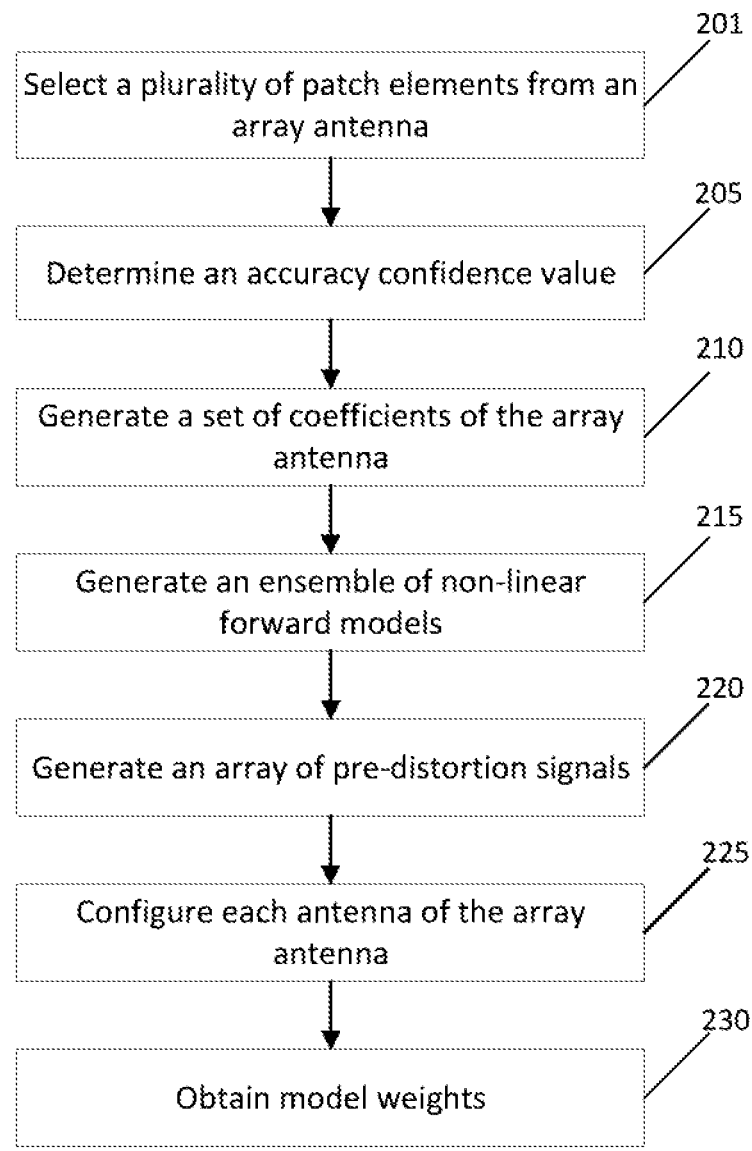
FIG. 16 illustrates an example flow diagram of a method according to an example embodiment.

FIG. 16 illustrates an example flow diagram of a method according to an example embodiment. In certain example embodiments, the flow diagram of FIG. 16 may be performed by a network node, such as a base station, node B, eNB, gNB, or any other access node, or one or more servers in a cloud configuration. Certain example embodiments may be configured to perform a method as executed by the apparatuses illustrated in FIGS. 3 and 17 discussed in detail above and below.

Specifically, as illustrated in FIG. 16, the method may include, at 201, selecting a plurality of patch elements from an array antenna of a network element. In an example embodiment, four patch elements may be selected. In another example embodiment, eight or less patch elements may be selected. A criteria for patch selection may include a correlation of observations, and achieving a valid statistical result. In an example embodiment, the patches maybe observed with maximum spatial separation, which results in less correlated observations.

In an example embodiment, the method may also include, at 205, determining an accuracy confidence value for each patch element. In an embodiment, the accuracy confidence value may be determined based on build data of each antenna of the array antenna. The build data may include, but not limited to, X-Rays, RFIC lot history, defect ratio, etc. In another example embodiment, determination of the accuracy confidence value may be performed by implementing a Bayesian formula.

According to an example embodiment, the method may further include, at 210, generating a set of coefficients of the antenna array. Additionally, according to another example embodiment, the method may include, at 215, generating an ensemble of non-linear forward models using the accuracy confidence value and the set of coefficients. The method may also include, at 220, generating an array of pre-distortion signals using the ensemble of non-linear forward models. Then the method may include, at 225, configuring each antenna of the array antenna with a corresponding pre-distortion signal from the array of pre-distortion signals. In another example embodiment, the configuring may include linearizing the array antenna with the pre-distortion signal.

The method may further include, at 230, obtaining model weights from the array antenna. In an example embodiment, the model weights may be saved into NVM and used during operation, and the pre-distortion signals may be generated using the model weights.

Figure 17:
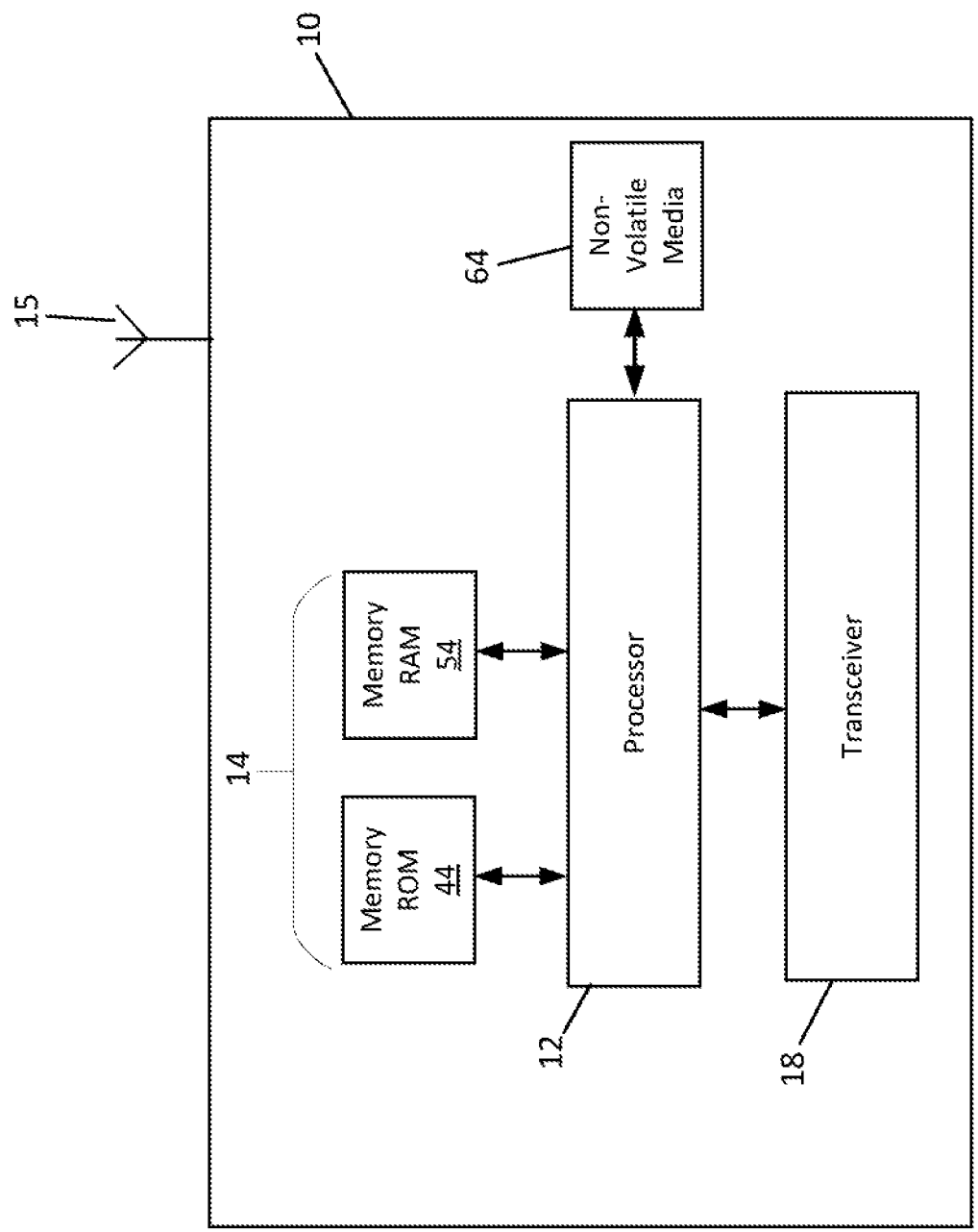
FIG. 17 illustrates an apparatus according to an example embodiment.

FIG. 17 illustrates an apparatus according to an example embodiment. In particular, FIG. 17 illustrates an apparatus 10 according to an example embodiment. In an example embodiment, the apparatus 10 may be a node, host, or server in a communications network or serving such a network. For example, apparatus 10 may be a base station, a Node B, an evolved Node B (eNB), 5G Node B or access point, next generation Node B (NG-NB or gNB) WLAN access point, mobility management entity (MME), and/or subscription server associated with a radio access network, such as a LTE network, 5G or NR or other radio systems which might benefit from an equivalent procedure.

It should be understood that, in some example embodiments, apparatus 10 may be comprised of an edge cloud server as a distributed computing system where the server and the radio node may be stand-alone apparatuses communicating with each other via a radio path or via a wired connection, or they may be located in a same entity communicating via a wired connection. For instance, in certain example embodiments where apparatus 10 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a front-haul interface. The DU may be a logical node that includes a subset of the gNB functions, depending on the functional split option. It should be noted that one of ordinary skill in the art would understand that apparatus 10 may include components or features not shown in FIG. 17.

As illustrated in the example of FIG. 17, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 17, multiple processors may be utilized according to other example embodiments. For example, it should be understood that, in certain example embodiments, apparatus 10 may include two or more processors that may form a multiprocessor system (e.g., in this case processor 12 may represent a multiprocessor) that may support multiprocessing. In certain example embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to management of communication resources.

Apparatus 10 may further include or be coupled to at least one memory 14 (internal or external), which may be coupled to processor 12, for storing information and instructions that may be executed by processor 12. Memory 14 may be one or more memories and of any type suitable to the local application environment, and may be implemented using any suitable volatile or non-volatile data storage technology such as a semiconductor-based memory device, a magnetic memory device and system, an optical memory device and system, fixed memory, and/or removable memory. For example, memory 14 can be comprised of any combination of random access memory (RAM) 54, read only memory (ROM) 44, non-volatile memory, static storage such as a magnetic or optical disk, hard disk drive (HDD), or any other type of non-transitory machine or computer readable media. For example, in an embodiment, apparatus 10 may include a non-volatile media 64. In an embodiment, non-volatile media 64 may be a removable media. Memory 14 and/or media 64 may store software, computer program code or instructions. The instructions stored in memory 14 or media 64 may include program instructions or computer program code that, when executed by processor 12, enable the apparatus 10 to perform tasks as described herein.

In an example embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some example embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15. The radio interfaces may correspond to a plurality of radio access technologies including one or more of GSM, NB-IoT, LTE, 5G, WLAN, BT-LE, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink (UL)). Transceiver 18 may comprise one or more RF chains for down and/or upconverting RF signals, for example comprising diplexers, front end RF amplifiers, mixers, filters, voltage controlled oscillators and the like, the activation of part or all of which may be activated in accordance with example embodiments.

As such, transceiver 18 may be configured to modulate information on to a carrier waveform for transmission by the antenna(s) 15 and demodulate information received via the antenna(s) 15 for further processing by other elements of apparatus 10. In other example embodiments, transceiver 18 may be capable of transmitting and receiving signals or data directly. Additionally or alternatively, in some example embodiments, apparatus 10 may include an input and/or output device (I/O device).

In an example embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some example embodiments, processor 12 and memory 14 may be included in or may form a part of processing circuitry or control circuitry. In addition, in some example embodiments, transceiver 18 may be included in or may form a part of transceiving circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to case an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in example embodiments, apparatus 10 may be a network node or RAN node, such as a base station, access point, Node B, eNB, gNB, WLAN access point, or the like. According to example embodiments, apparatus 10 may be controlled by memory 14 and processor 12 to perform the functions associated with any of the example embodiments described herein, such as the flow diagrams illustrated in FIGS. 15 and 16. Additionally, in certain embodiments, apparatus 10 may include or implement the systems illustrated in FIGS. 1-14. In example embodiments, for instance, apparatus 10 may be configured to perform a process for adaptive DPD.

For instance, in some example embodiments, apparatus 10 may be controlled by memory 14 and processor 12 to select a plurality of patch elements from an array antenna of a network element, determine an accuracy confidence value for each path element, and generate a set of coefficients of the array antenna. In an example embodiment, four patch elements may be selected. In another example embodiment, eight or less patch elements may be selected. A criteria for patch selection may include a correlation of observations, and achieving a valid statistical result. In an example embodiment, the patches maybe observed with maximum spatial separation, which results in less correlated observations.

In an example embodiment, apparatus 10 may be controlled by memory 14 and processor 12 to determine an accuracy confidence value for each patch element. In an embodiment, the accuracy confidence value may be determined based on build data of each antenna of the array antenna. The build data may include, but not limited to, X-Rays, RFIC lot history, defect ratio, etc. In another example embodiment, determination of the accuracy confidence value may be performed by implementing a Bayesian formula.

According to an example embodiment, apparatus 10 may be controlled by memory 14 and processor 12 to generate a set of coefficients of the antenna array. Additionally, according to another example embodiment, apparatus 10 may be controlled by memory 14 and processor 12 to generate an ensemble of non-linear forward models using the accuracy confidence value and the set of coefficients. Apparatus 10 may also be controlled by memory 14 and processor 12 to generate an array of pre-distortion signals using the ensemble of non-linear forward models. Then apparatus 10 may be controlled by memory 14 and processor 12 to configure each antenna of the array antenna with a corresponding pre-distortion signal from the array of pre-distortion signals. In another example embodiment, the configuring may include linearizing the array antenna with the pre-distortion signal.

In another example embodiment, apparatus 10 may be controlled by memory 14 and processor 12 to obtain model weights from the array antenna. According to an example embodiment, the model weights may be saved into NVM and used during operation, and the pre-distortion signals may be generated using the model weights.

The above embodiments may provide for significant improvements to the functioning of a network and/or to the functioning of the network entities within the network, or the user equipment communicating with the network. For example, the above example embodiments may provide a DPD technique to alleviate issues with cost and power dissipation in 5G base stations that use active antenna arrays for beam forming. The above example embodiments may also provide DPD models with a high confidence level of accuracy using only four observations based on Bayesian statistics. For instance, as noted above, FIG. 8 illustrates that the process with 98% certainty needs only three observations, whereas the loss process with 80% certainty needs eight observations to achieve a similar confidence level of DPD modeling.

According to the above example embodiments, an adaptive DPD array algorithm may be provided. During the DPD training phase, the adaptive DPD array algorithm may use few conducted observation paths to learn how to maintain the original EVM which was obtained off-line. Then in real-time, in the closed loop operation, the model weights (high confidence) are updated in pseudo real-time (closed loop) maintaining the original OTM EVM, while minimizing the residual EVM with respect to the OTA method.

According to the above example embodiments, it may also be possible to run RFIC amplifiers at a smaller back-off power. For example, incorporating DPD may allow for RFIC to run at higher power (smaller back-off), which in turn may make it possible to turn OFF some RFICs obtaining the same EIRP. Since some RFIC may be switched off, this leads to a lower DC power dissipation. Accordingly, it may be possible to reduce power dissipation/heat generation while maintaining EIRP using fewer RFIC amplifiers. This in turn reduces cost (RFIC operating at 5G frequencies such as 39 GHz), while improving performance and reliability.

As an example of the power and cost savings provided by the above example embodiments, and with reference to FIG. 5, when $P_{out}$=6 dBm, there is about 1 to 2 dB power extension because of DPD linearization. This translates to reducing the number of RFICs and the power dissipation as described below. For instance, if 1 dB power extension is considered, $$10^{\frac{1dB}{20}}=89\%.$$

Further, if 2 dB power extension is considered, $$10^{\frac{2dB}{20}}=79\%.$$

Thus, using DPD linearization makes it possible to save power and reduce the number of RFICs to between about 79% to about 89%.

Considering that a typical single polarity array often uses a total of 256 active elements, which typically entails 64 actual RFICs, reducing the number of devices by 10% to 20% may provide a significant cost saving. Additionally, in terms of power savings, a typical power dissipation per single polarity array antenna may usually be around 100 W for a tx antenna, and around 100 W for an Rx antenna. Thus, power saving of 2×100 W×(1−0.89)=22 W or 2×100 W×(1−0.79)=42 W power saving per dual polarity radio may be expected.

The features, structures, or characteristics of certain embodiments described throughout this specification may be combined in any suitable manner in one or more embodiments. For example, the usage of the phrases "certain embodiments," "some embodiments," "other embodiments," or other similar language, throughout this specification refers to the fact that a particular feature, structure, or characteristic described in connection with the embodiment may be included in at least one embodiment of the present invention. Thus, appearance of the phrases "in certain embodiments," "in some embodiments," "in other embodiments," or other similar language, throughout this specification does not necessarily refer to the same group of embodiments, and the described features, structures, or characteristics may be combined in any suitable manner in one or more embodiments.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. Although the above embodiments refer to 5G NR and LTE technology, the above embodiments may also apply to any other present or future 3GPP technology, such as LTE-advanced, and/or fourth generation (4G) technology.

Partial Glossary
DPD Digital Pre-Distortion
EIRP Equivalent Isotropic Radiated Power
eNB enhanced Node B (LTE base station)
EVM Error Vector Magnitude with Memory
FFT Fast Fourier Transformation
gNB 5G or NR base station
ILA Indirect Learning Algorithm
LS Least Squire Error
LTE Long Term Evolution
LUT Look Up Table
MIMO Multiple Input Multiple Output
NR New Radio
NR-U New Radio Unlicensed
OTA On the Air
PA Power Amplifier
RF Radio Frequency
RFIC Radio Frequency Integrated Circuit
SISO Single Input single Output
UE User Equipment
UL Uplink

We claim:

1. A method, comprising:
   selecting a plurality of patch elements from an array antenna of a network element;
   determining an accuracy confidence value for each patch element;
   generating a set of coefficients of the array antenna;
   generating an ensemble of non-linear forward models using the accuracy confidence value and the set of coefficients;
   generating an array of pre-distortion signals using the ensemble of non-linear forward models; and
   configuring each antenna of the array antenna with a corresponding pre-distortion signal from the array of pre-distortion signals.

2. The method according to claim 1, wherein the method further comprises obtaining model weights for the array antenna.

3. The method according to claim 1, wherein selecting the plurality of patch elements comprises:
   selecting at least four different patch elements.

4. The method according to claim 1, wherein the determining the accuracy confidence value is based on build data of each antenna of the array antenna.

5. The method according to claim 1, wherein the configuring comprises:
   linearizing the array antenna with the pre-distortion signal.

6. The method according to claim 1, wherein the determining the accuracy confidence value comprises implementing a Bayesian formula.

7. A non-transitory computer readable medium comprising a computer program having instructions stored thereon which, when executed in an apparatus, cause the apparatus to perform the method according to claim 1.

8. An apparatus, comprising:
   at least one processor; and
   at least one memory comprising computer program code,
   the at least one memory and computer program code being configured, with the at least one processor, to cause the apparatus at least to
   select a plurality of patch elements from an array antenna of a network element;
   determine an accuracy confidence value for each patch element;
   generate a set of coefficients of the array antenna;
   generate an ensemble of non-linear forward models using the accuracy confidence value and the set of coefficients;
   generate an array of pre-distortion signals using the ensemble of non-linear forward models; and
   configure each antenna of the array antenna with a corresponding pre-distortion signal from the array of pre-distortion signals.

9. The apparatus according to claim 8, wherein the at least one memory and computer program code are configured, with the at least one processor, to cause the apparatus at least to:
   obtain model weights for the array antenna.

10. The apparatus according to claim 8, wherein the at least one memory and computer program code are configured, with the at least one processor, to cause the apparatus at least to:
    select at least four different patch elements.

11. The apparatus according to claim 8, wherein the determining the accuracy confidence value is based on build data of each antenna of the array antenna.

12. The apparatus according to claim 8, wherein the at least one memory and computer program code are configured, with the at least one processor, to cause the apparatus at least to:
    linearize the array antenna with the pre-distortion signal.

13. The apparatus according to claim 8, wherein the at least one memory and computer program code are configured, with the at least one processor, to cause the apparatus at least to:
    implement a Bayesian formula in determining the accuracy confidence value.

14. An apparatus, comprising:
    circuitry configured to select a plurality of patch elements from an array antenna of a network element;
    circuitry configured to determine an accuracy confidence value for each patch element;
    circuitry configured to generate a set of coefficients of the array antenna;
    circuitry configured to generate an ensemble of non-linear forward models using the accuracy confidence value and the set of coefficients;
    circuitry configured to generate an array of pre-distortion signals using the ensemble of non-linear forward models; and
    circuitry configured to configure each antenna of the array antenna with a corresponding pre-distortion signal from the array of pre-distortion signals.

* * * * *